United States Patent
Lee et al.

(10) Patent No.: US 7,811,959 B2
(45) Date of Patent: Oct. 12, 2010

(54) METAL OXIDE-CARBON COMPOSITE CATALYST SUPPORT AND FUEL CELL COMPRISING THE SAME

(75) Inventors: Seol-ah Lee, Yongin-si (KR); Chan-ho Pak, Seoul (KR)

(73) Assignee: Samsung SDI Co., Ltd., Suwon (KR)

( * ) Notice: Subject to any disclaimer, the term of this patent is extended or adjusted under 35 U.S.C. 154(b) by 1307 days.

(21) Appl. No.: 10/976,783

(22) Filed: Nov. 1, 2004

(65) Prior Publication Data

US 2005/0112451 A1 May 26, 2005

(30) Foreign Application Priority Data

Nov. 13, 2003 (KR) ............... 10-2003-0080091

(51) Int. Cl.
*H01M 4/88* (2006.01)
*B01J 21/18* (2006.01)
*B01J 23/00* (2006.01)
*B01J 23/40* (2006.01)

(52) U.S. Cl. ............... 502/180; 502/101; 502/182; 502/184; 502/185; 429/40; 429/41; 429/42; 429/43; 429/44

(58) Field of Classification Search ............. 502/182, 502/184, 185, 101, 180; 429/40–44
See application file for complete search history.

(56) References Cited

U.S. PATENT DOCUMENTS

| | | | | |
|---|---|---|---|---|
| 3,236,693 A | * | 2/1966 | Caesar | ............... 429/19 |
| 3,406,228 A | * | 10/1968 | Hardy et al. | ............... 264/0.5 |
| 4,591,578 A | * | 5/1986 | Foley et al. | ............... 502/185 |
| 5,037,791 A | * | 8/1991 | Comolli et al. | ............... 502/185 |
| 5,621,609 A | * | 4/1997 | Zheng et al. | ............... 361/503 |
| 5,693,417 A | * | 12/1997 | Goedicke et al. | ............... 428/336 |
| 5,972,525 A | * | 10/1999 | Mori et al. | ............... 428/632 |
| 6,387,531 B1 | * | 5/2002 | Bi et al. | ............... 428/570 |
| 6,670,300 B2 | * | 12/2003 | Werpy et al. | ............... 502/182 |
| 6,818,341 B2 | * | 11/2004 | Uribe et al. | ............... 429/42 |
| 7,566,388 B2 | * | 7/2009 | Sasaki et al. | ............... 204/283 |
| 7,572,543 B2 | * | 8/2009 | Mei et al. | ............... 429/44 |
| 2002/0184969 A1 | * | 12/2002 | Kodas et al. | ............... 75/330 |
| 2004/0087441 A1 | * | 5/2004 | Bock et al. | ............... 502/313 |

FOREIGN PATENT DOCUMENTS

JP    59-186265    * 10/1984

(Continued)

OTHER PUBLICATIONS

Z. Jusys, et al, "Activity of PtRuMeO$_x$ (Me = W, Mo or V) catalysts towards methanol oxidation and their characterization", Journal of Power Sources 105, (2002), pp. 297-304.

(Continued)

*Primary Examiner*—Patricia L Hailey
(74) *Attorney, Agent, or Firm*—H.C. Park & Associates, PLC

(57) ABSTRACT

A catalyst support for a fuel cell, having good hydrophilic property and electroconductivity, an anode including the same, and a fuel cell including the anode are provided. The catalyst support is composed of a metal oxide-carbon composite.

12 Claims, 3 Drawing Sheets

FOREIGN PATENT DOCUMENTS

| | | | |
|---|---|---|---|
| JP | 05-174838 | * | 7/1993 |
| JP | 05174838 | | 7/1993 |
| JP | 05-261284 | * | 10/1993 |
| JP | 2003308849 | | 10/2003 |
| JP | 2003317726 | | 11/2003 |
| JP | 2005138204 | | 6/2005 |
| KR | 10-2000-0063843 | | 11/2000 |
| KR | 10-2002-0084825 | | 11/2002 |

OTHER PUBLICATIONS

K. Lasch, "Mixed conducting catalyst support materials for the direct methanol fuel cell", Journal of Power Sources 105, (2002), pp. 305-310.

Kyung-Won Park, et al, "New $RuO_2$ and carbon-$RuO_2$ composite diffusion layer for use in direct methanol fuel cells", Journal of Power Sources 109, (2002), pp. 439-445.

* cited by examiner

METAL OXIDE-CARBON COMPOSITE CATALYST SUPPORT AND FUEL CELL COMPRISING THE SAME

This application claims the benefit of Korean Patent Application No. 2003-80091, filed on Nov. 13, 2003, in the Korean Intellectual Property Office, which is hereby incorporated by reference for all purposes as if fully set forth herein.

BACKGROUND OF THE INVENTION

1. Field of the Invention

The present invention relates to a catalyst support having good electroconductivity and hydrophilicity, an anode comprising the same, and a fuel cell comprising the anode.

2. Discussion of the Related Art

A fuel cell, which is a future source of clean energy that may replace fossil energy, has high power density and high energy conversion efficiency. Since the fuel cell may be operated at an ambient temperature and may be miniaturized and hermetically sealed, it may be extensively applied to the fields of zero-emission vehicles, home power generating systems, mobile telecommunications equipment, medical equipment, military equipment, space equipment, and portable electronic devices.

Fuel cells convert energy produced through electrochemical reactions of a fuel (hydrogen or methanol solution) and an oxidizing agent (oxygen or air) into electric energy. Such fuel cells may be classified as molten carbonate electrolyte fuel cells, which operate at temperatures of 500-700° C., phosphoric acid electrolyte cells, which operate at approximately 200° C., and alkaline electrolyte fuel cells and polymer electrolyte fuel cells, which operate between room temperature and 100° C.

Polymer electrolyte fuel cells include proton exchange membrane fuel cells (PEMFCs) using hydrogen gas as a fuel and direct methanol fuel cells (DMFCs) using liquid methanol solution directly applied to the anode as a fuel.

Generally, PEMFCs using hydrogen gas as a fuel have high energy density, but handling hydrogen gas requires caution and an additional appliance, such as a fuel reformer for reforming methane, methanol, and natural gas, is required to produce the hydrogen gas.

Although DMFCs have lower energy density than PEMFCs, they are considered to be suitable as a small and general-purpose portable power source from the viewpoint of manageability and low operating temperatures, and they do not require an additional fuel reforming apparatus. The fuel cell includes an anode and a cathode, to which reactant liquid/gas are supplied, and a proton conductive membrane interposed between the anode and the cathode. At the anode, decomposed methanol produces protons and electrons. The protons move through a proton conductive membrane and meet with oxygen to produce water at the cathode. Electrons moving from the anode to the cathode produce electricity.

Currently, in PEMFCs and DMFCs, the cathode uses Pt particles dispersed in a carbon support, and the anode uses Pt—Ru particles dispersed in a carbon support. A noble metallic catalyst is typically used as the catalyst of a fuel cell having such a structure, which increases the cost. Thus, catalysts having high dispersion and high efficiency using a proper carbon support are being considered for decreasing the amount of the noble metallic catalyst used.

In order to be used as a catalyst support, carbon should have proper physical properties such as an electroconductivity, a surface functional group, a mechanical strength, a surface area, a pore size, a particle size, and a shape. When used as a catalyst support for the fuel cell, the carbon should have a high electroconductivity and have a hydrophilic surface functional group that transfers methanol solution effectively and is easily dispersed in a solvent (used) when the catalyst is synthesized.

Carbon blacks such as acetylene black, Vulcan, Ketjen black, and an activated carbon are currently used in fuel cells. Specialized carbons, such as a mesoporous carbon, a carbon fiber and a carbon nanotube, are being researched.

10-60 wt % Pt or PtRu catalysts supported by Vulcan XC 72R may be purchased on the open market, and many research institutes and companies have used them.

Lasch et al. researched the use of a metal oxide as a catalyst support [K. Lasch, G. Hayn, L. Jorissen, J. Garche, and O. Besenhardt, Journal of Power Sources, 105 (2002), pp. 305-310]. Lasch et al. described that when ruthenium oxide synthesized to particle size of 13-14 nm was used as the catalyst support, the resulting catalyst had lower catalytic activity than commercially available catalysts. In other words, since only ruthenium oxide was used as the catalyst support, its small surface area provided for ineffective catalyst distribution, thereby resulting in lower catalyst activity.

Jusys et al. researched the use of a metal oxide as a cocatalyst [Z. Jusys, T. J. Schmidt, L. Dubau, K. Lasch, L. Jorrisen, J. Garche, and R. J. Behm, Journal of Power Sources, 105 (2002), pp. 297-304]. Jusys et al. described that PtRu and metal oxide are simultaneously synthesized in form of alloy by applying the Adams method. These metal oxides were used as the cocatalyst for preventing CO poisoning. In Jusys' results, thermal treatment was required since PtRu and a metal oxide was in the form of an alloy. Vanadium, molybdenum, and tungsten oxides were researched.

Kyung-Won Park et al. researched the application of a nano-composite of ruthenium oxide-acetylene black to a fuel diffusion layer [Kyung-Won Park and Yung-Eun Sung, Journal of Power Sources, 109 (2002), pp. 439-445]. It is assumed that the nano-composite of ruthenium oxide-acetylene black is not utilized as the catalyst support, but is just used in the fuel diffusion layer.

SUMMARY OF THE INVENTION

The present invention provides a metal oxide-carbon composite catalyst support that may have increased electroconductivity and hydrophilicity compared to a conventional catalyst support composed of only carbon or a metal oxide, an anode using the same, and a fuel cell using the anode.

Additional features of the invention will be set forth in the description which follows, and in part will be apparent from the description, or may be learned by practice of the invention.

The present invention discloses a catalyst support consisting of a metal oxide-carbon composite.

The present invention also discloses a catalyst for a fuel cell, consisting of a metal oxide-carbon composite catalyst support and platinum or a platinum alloy supported on the catalyst support.

The present invention also discloses an anode for a fuel cell having a substrate, a diffusion layer, and a catalyst layer sequentially laminated. The catalyst layer includes a catalyst support consisting of a metal oxide-carbon composite.

The present invention also discloses a fuel cell including an anode, a cathode, and a polymer electrolyte. The anode and the cathode have a sequentially laminated substrate, diffusion layer, and catalyst layer. At least one catalyst layer includes a catalyst support consisting of a metal oxide-carbon composite.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE INVENTION

Figure 1:
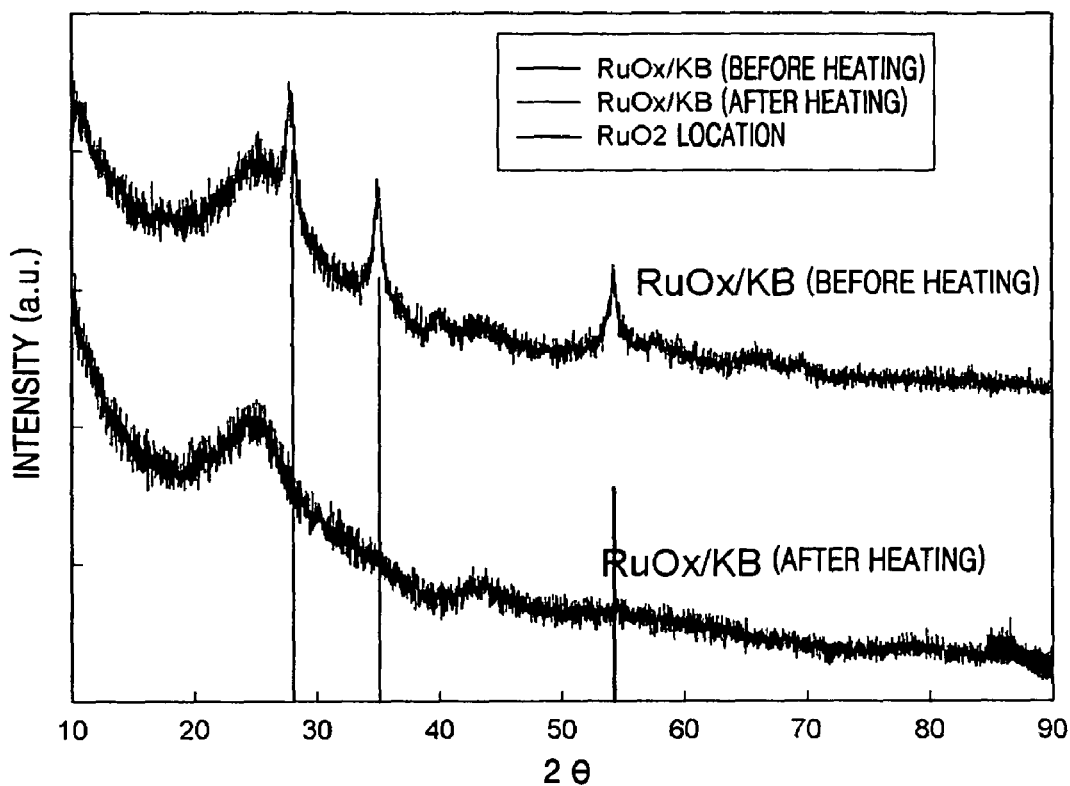
FIG. 1 is an X-ray diffraction analysis spectrum of a catalyst support according to an exemplary embodiment of the present invention.

Hereinafter, exemplary embodiments of the present invention will be described in more detail.

A catalyst support according to an exemplary embodiment of the present invention is composed of a composite of carbon and a metal oxide. A content of the carbon may be in a range of 1% to 80% by weight of the composite.

The metal oxide may be an oxide of any one metal selected from Ru, V, W, Re, Os, Rh, Ti, Cr, Mn, Fe, Co, Ni, Cu, Zn, Mo, Ta, Ir, Pt, Au, and Sn. Examples of such metal oxide include $RuO_2$, $V_2O_3$, $MoO_2$, $WO_2$, $ReO_3$, $OSO_2$, $RhO_2$, $TiO_2$, $V_2O_5$, $Cr_2O_3$, $Mn_2O_3$, $MnO_2$, $Fe_2O_3$, $CO_3O_4$, $NiO$, $Ni_2O_3$, $CuO$, $ZnO$, $MoO_3$, $RuO_4$, $Ta_2O_5$, $WO_3$, $Re_2O_3$, $IrO_2$, $PtO$, $PtO_2$, $Au_2O_3$, $SnO_2$, $SnO$, $Rh_2O_3$, and other like substances. Among these metal oxides, $WO_3$, $MoO_3$ and $RuO_2$ are preferred, and $RuO_2$ is particularly preferred.

The carbon used in the catalyst support may include a carbon black, an activated carbon, a mesoporous carbon, a carbon nanotube, a carbon fiber, and other like substances.

Catalyst particles supported on the catalyst support may be nanoparticles having a particle diameter of 10 nm or less. The catalytic activity may be small if the particles are larger than 10 nm.

A metal oxide-carbon composite catalyst support may be produced by dissolving a metal salt solution to carbon and adding an additive capable of forming a metal oxide. The resulting particles may be filtered and dried to obtain a metal oxide-carbon composite. Next, a metal or a metal alloy catalyst may be supported thereon, thereby completing a fuel cell catalyst.

In other words, the metal oxide-carbon composite and the metallic salt used for preparing a catalyst may be separately dispersed in a solvent and the separately dispersed solutions may be mixed and stirred. A reducing agent may be added to the mixture to precipitate formation of the catalyst metal on the catalyst support, and the resultant may then be washed and dried to complete the fuel cell catalyst.

Metals used as the catalyst may include Pt, PtRu, PtNi, PtRuNi, and other like substances. PtRu is preferred since Ru reduces CO poisoning of a Pt catalyst in an electrochemical methanol oxidation reaction.

Various metallic salts may be used for preparing the catalyst. Examples include chlorides, nitrides, and sulfides of the foregoing metals.

An anode and a cathode may be prepared by using a catalyst layer composed of the catalyst as describe above and a substrate, and interposing a polymer electrolyte membrane therebetween, thereby completing a fuel cell.

The present invention will be described in greater detail with reference to the following examples. The following examples are for illustrative purposes and are not intended to limit the scope of the invention.

EXAMPLES

Example 1

Preparation of a Catalyst Support 1.5564 g of ruthenium chloride was added to 600 ml of ultra-distilled water, and the solution was stirred for 2 hours. $NaHCO_3$ was added to the solution until attaining a pH of 5, so as to form a colloidal solution. Then, Ketjen Black, as a carbon dispersed in 400 ml of deionised water, was added to the colloidal solution, and the resulting mixture was stirred for 24 hours. The resultant was then washed with water and filtered, and a ruthenium oxide-carbon composite support was formed by freeze-drying.

The dried ruthenium oxide-Ketjen Black composite catalyst support ($RuO_2$—KB) was then heated in a convection oven of 180° C. for 12 hours.

An X-ray diffraction analysis was performed to investigate the ruthenium oxide-Ketjen Black composite catalyst support's physical properties. FIG. 1 shows the results. As is apparent from FIG. 1, ruthenium oxide, which did not shown crystalline property before heating, showed crystalline property after heating.

Experimental Example

A wetting stress and an electroconductivity of the ruthenium oxide-Ketjen Black composite catalyst support were measured in order to evaluate its performance. For comparison, the same properties of a support composed of only Ketjen Black were also measured.

Measuring the Wetting Stress

Figure 2:
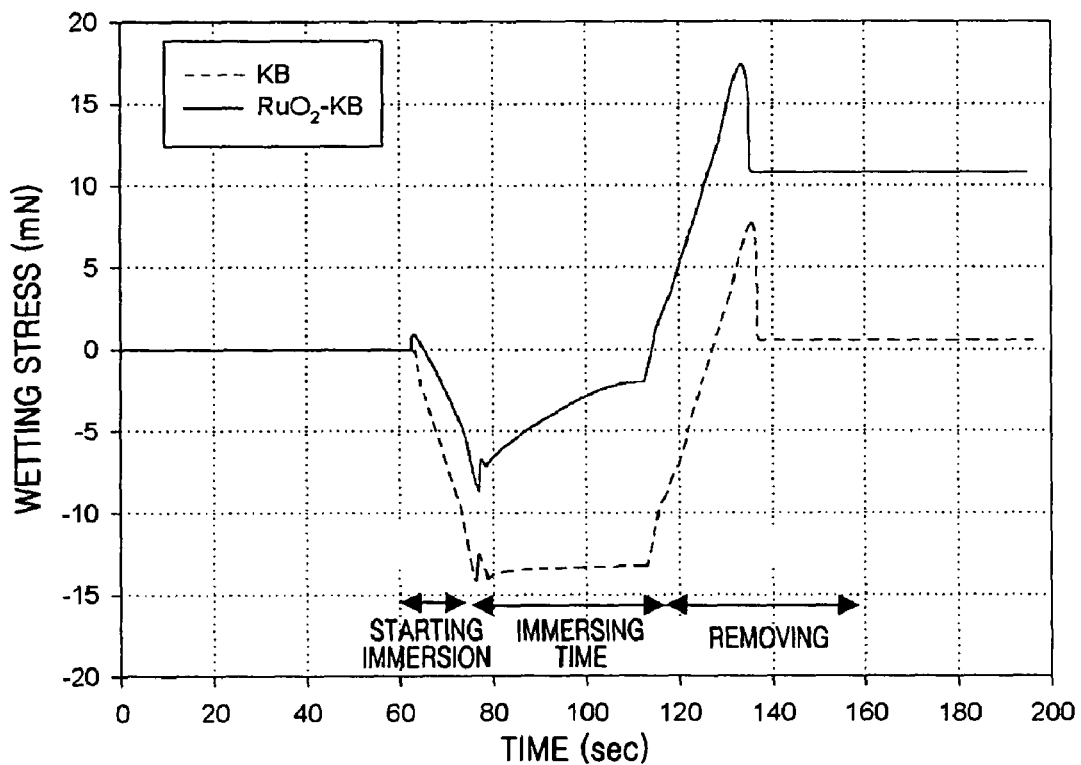
FIG. 2 is a graph illustrating wetting stress over time for a catalyst support according to an exemplary embodiment of the present invention.

The wetting stress over time for the ruthenium oxide-Ketjen Black composite support of Example 1, and a conventional support of Ketjen Black, were measured. FIG. 2 shows the results.

As is apparent from FIG. 2, the initial wetting stress of Ketjen Black was about −14 mN and that of the composite support was about −7 mN, indicating a decrease of about 50%. Also, when immersed for about 50 seconds, the wetting stress of Ketjen Black hardly changed from the initial value, but that of the composite support rapidly decreased to about −2 mN.

As may be seen from these results, the composite support according to an exemplary embodiment of the present invention has higher hydrophilic property than the conventional support using only carbon.

Measuring the Electroconductivity

To measure the ruthenium oxide-Ketjen Black composite catalyst support's electroconductivity, it was prepared in the form of a circular pellet having a 13 mm diameter under a pressure of 7 tons. The pellet was placed in a conductivity measurement test kit where its thickness and resistance were measured. A conventional support was similarly prepared and measured. The conventional support had a calculated electroconductivity of 23 S/cm, and the composite support had a calculated electroconductivity of 33 S/cm, indicating increased electroconductivity of the ruthenium oxide-Ketjen Black composite catalyst support.

Example 2

Preparation of a Catalyst 5.128 g of $H_2PtCl_6$, 2.123 g of $RuCl_3$, and 2 g of $RuO_2$—KB (synthesized in Example 1) were added to 1000 ml, 1000 ml, and 200 ml of distilled water, respectively. The solutions were mixed and stirred for 2 hours, and a pH of the resulting solution was set to pH 7 by a 0.05 M NaOH solution. Next, 1M $NaBH_4$ was added to the solution, in an amount of 3 times of stoichiometric amount, at a rate of 50 cc/min. The resultant was subject to washing/freeze-drying process to form 60 wt % PtRu/$RuO_2$—KB, which was heated under a hydrogen gas atmosphere at 150° C. for 2 hours in order to increase a catalytic activity.

Figure 3:
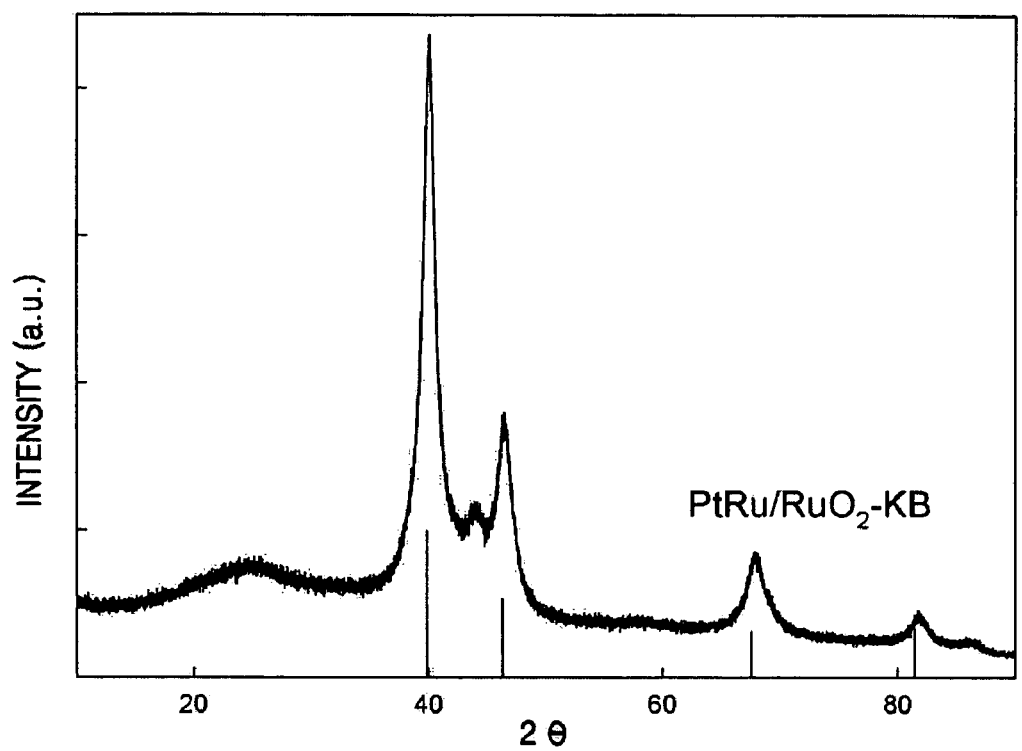
FIG. 3 is an X-ray diffraction analysis spectrum of a 60 wt % Pt—Ru alloy catalyst including a catalyst support according to an exemplary embodiment of the present invention.

X-ray diffraction analysis was performed to measure the physical properties of the prepared platinum ruthenium alloy catalyst (60 wt % PtRu/$RuO_2$—KB). FIG. 3 shows the results.

Referring to FIG. 3, the main peak of Pt (111) and Pt (220) was higher than the peak of only Pt, indicating that an alloy of Pt and Ru was properly formed. In other words, the original peak position of Pt (111), which is 39.4 degree, and that of Pt (220), which is 67.4 degree, shift to higher angles with formation of alloy of Pt and Ru. This is because Ru, which has a smaller atomic radius than that of Pt, is inserted into the lattice of Pt with formation of alloy, and the lattice parameter becomes smaller, and therefore, peak positions shift to higher angles.

Figure 4:
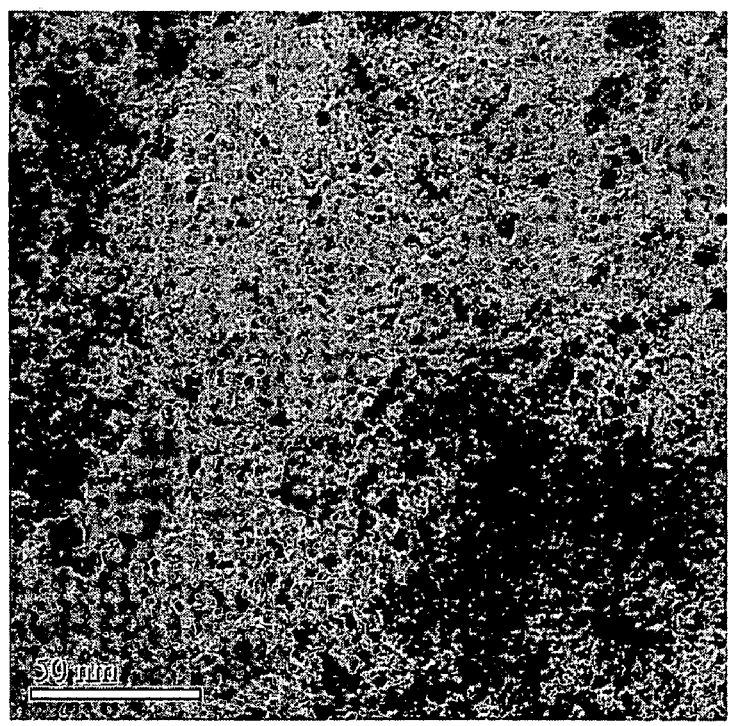
FIG. 4 is a transmission electron microscopy (TEM) photograph of a 60 wt % Pt—Ru alloy catalyst including a catalyst support according to an exemplary embodiment of the present invention.

Further, FIG. 4 shows a TEM photograph of the platinum ruthenium alloy catalyst (60 wt % PtRu/$RuO_2$—KB).

Referring to FIG. 4, aggregated PtRu particles were not observed, indicating that the platinum ruthenium alloy was uniformly distributed in the composite support.

Figure 5:
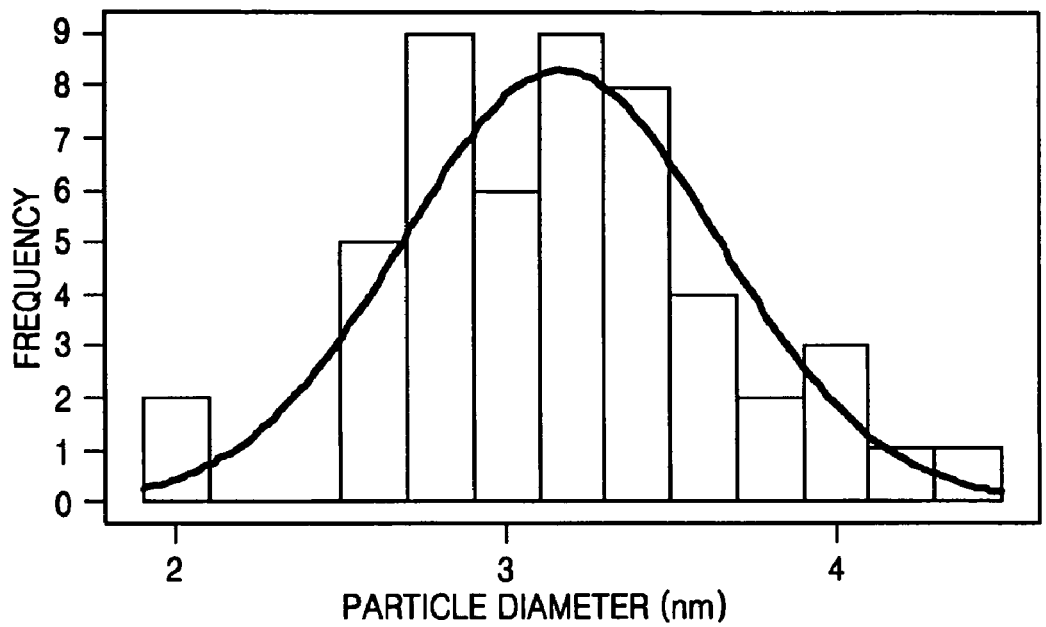
FIG. 5 shows a particle size distribution of a 60 wt % Pt—Ru alloy catalyst including a catalyst support according to an exemplary embodiment of the present invention.

Referring to FIG. 5, which shows a particle size distribution of the platinum ruthenium alloy catalyst (60 wt % PtRu/$RuO_2$—KB), the platinum ruthenium alloy was formed with particles having an average diameter of 3.2 nm.

Example 3

Manufacturing a Fuel Cell

To apply the 60 wt % platinum ruthenium alloy catalyst prepared in Example 2 to an anode of a DMFC, Nafion ionomer and isopropyl alcohol (IPA) were mixed, and 4 mg per unit area of the mixture was applied to a diffusion electrode by spraying. The resultant was dried at 80° C. to form the anode of the fuel cell.

The anode was joined with a cathode and a membrane, which were applied under high temperature and pressure, thereby forming a unit cell of the DMFC.

The cell was placed in a unit cell test kit to measure its performance. For comparison, the performance of a unit cell of a DMFC using an anode with a commercially available catalyst (PtRu black) was also measured.

Figure 6:
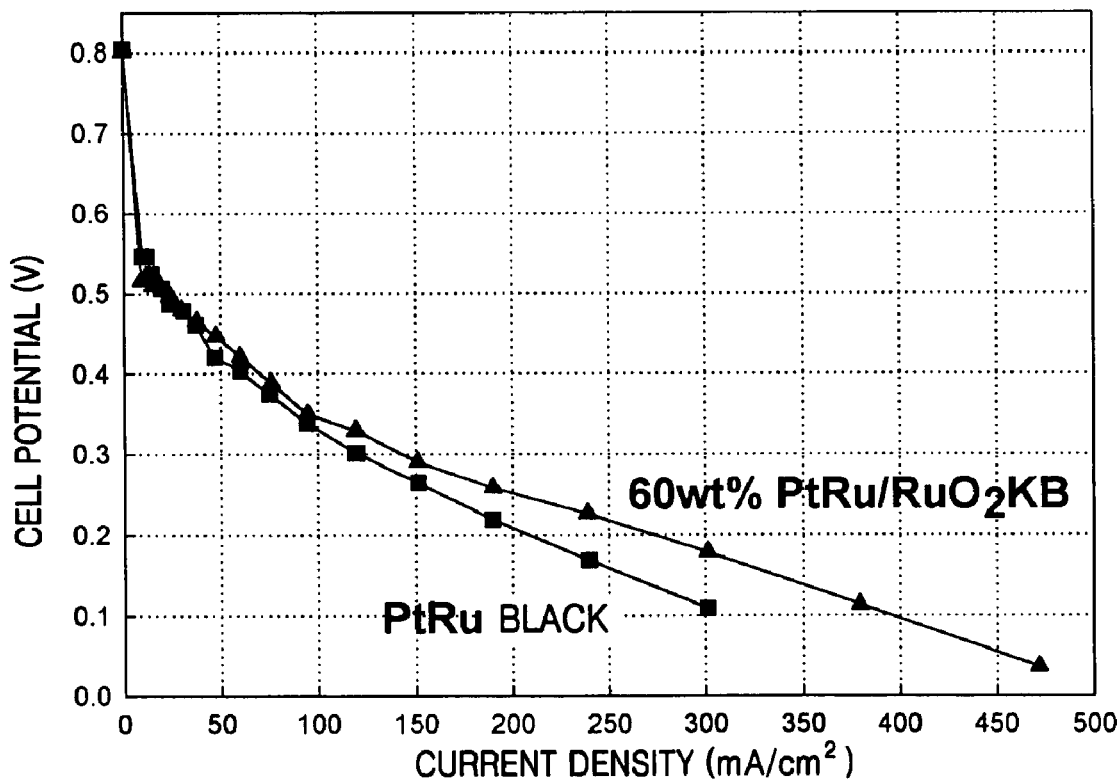
FIG. 6 shows a current density of a fuel cell according to an exemplary embodiment of the present invention.

The cells' performance was measured at 40° C. while supplying a 2M methanol solution and dry air, in an amount of three times a stoichiometric amount, as fuels to the cells. FIG. 6 shows the results.

As is apparent from FIG. 6, the fuel cell according to an exemplary embodiment of the present invention had a current density of about 145 mA/$cm^2$ at a cell potential of 0.3 V. On the other hand, under the same conditions, the fuel cell using the commercial catalyst had a current density of about 118 mA/$cm^2$. Therefore, the fuel cell of the present invention showed about a 23% improvement in performance.

As described above, a ruthenium oxide-carbon composite catalyst support according to an exemplary embodiment of the present invention may have higher electroconductivity and better hydrophilic properties than a conventional Ketjen Black support using only carbon. Additionally, the ruthenium oxide in the composite may also act as a cocatalyst, thereby resulting in an increased catalytic activity.

The metal oxide-carbon composite of the present invention may be used as a catalyst support of DMFC or PEMFC, and its characteristics and activity may be particularly good when used as an anode support for a DMFC.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A catalyst support for a fuel cell, comprising:
   a composite comprising metal oxide and carbon,
   wherein the metal oxide is an oxide of any one metal selected from the group consisting of Re, Os, Rh, Ta, Ir, Pt, and Au.

2. The catalyst support of claim 1, wherein the metal oxide is any one selected from the group consisting of $ReO_3$, $OsO_2$, $RhO_2$, $RuO_4$, $Ta_2O_5$, $Re_2O_3$, PtO, $PtO_2$, $Au_2O_3$, and $Rh_2O_3$.

3. The catalyst support of claim 2, wherein the carbon is any one selected from the group consisting of a carbon black, an activated carbon, a mesoporous carbon, a carbon nanotube, and a carbon fiber.

4. The catalyst support of claim 1, wherein the carbon is any one selected from the group consisting of a carbon black, an activated carbon, a mesoporous carbon, a carbon nanotube, and a carbon fiber.

5. The catalyst support of claim 1, wherein a content of the carbon is in a range of 1% to 80% by weight of the catalyst support.

6. A catalyst support for a fuel cell, comprising:
   a composite comprising metal oxide and carbon,
   wherein the metal oxide has crystalline properties, and
   wherein the metal oxide is $RuO_2$.

7. The catalyst support of claim 6, wherein the carbon is any one selected from the group consisting of a carbon black, an activated carbon, a mesoporous carbon, a carbon nanotube, and a carbon fiber.

8. The catalyst support of claim 7, wherein catalyst particles are supported on the catalyst support, the catalyst particles having a particle size of 10 nm or less.

9. A catalyst for a fuel cell, comprising:
   a catalyst support; and
   platinum or a platinum alloy,
   wherein the catalyst support is made of a metal oxide-carbon composite,
   wherein the catalyst support supports the platinum or the platinum alloy, and wherein the metal oxide is an oxide of any one metal selected from the group consisting of Ru, V, W, Re, Os, Rh, Ti, Cr, Mn, Fe, Co, Ni, Cu, Zn, Mo, Ta, Ir, Pt, Au, and Sn.

10. The catalyst of claim 9, wherein catalyst particles are supported on the catalyst support, the catalyst particles having a particle size of 10 nm or less.

11. The catalyst of claim 9, wherein the platinum alloy is an alloy of platinum and ruthenium.

12. The catalyst of claim 9, wherein a content of carbon in the metal oxide-carbon composite is in a range of 1% to 80% by weight of the metal oxide-carbon composite.

* * * * *